D. W. KELLER.
WATER WHEEL FOR FISHWAYS.
APPLICATION FILED FEB. 25, 1918.
1,276,374.
Patented Aug. 20, 1918.
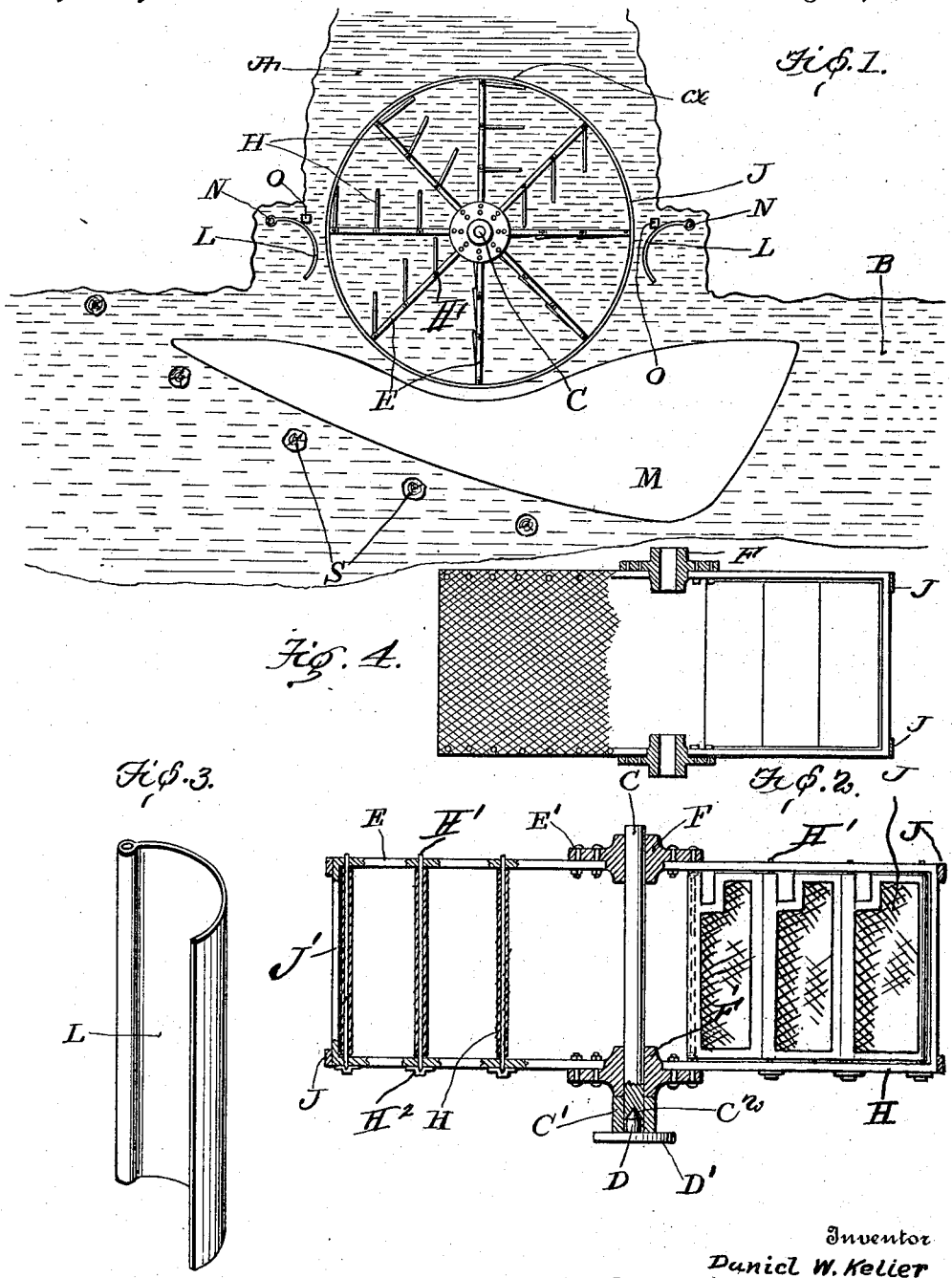

UNITED STATES PATENT OFFICE.

DANIEL W. KELLER, OF HARTSHORNE, OKLAHOMA.

WATER-WHEEL FOR FISHWAYS.

1,276,374.  Specification of Letters Patent.  Patented Aug. 20, 1918.

Application filed February 25, 1918. Serial No. 219,053.

*To all whom it may concern:*

Be it known that I, DANIEL W. KELLER, a citizen of the United States, residing at Hartshorne, in the county of Pittsburg and State of Oklahoma, have invented certain new and useful Improvements in Water-Wheels for Fishways; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for preventing fish and drift from going into waterways and the object of the invention is to generally improve upon and render more efficient apparatus of this nature.

The present invention comprises various details of construction, combinations and arrangements of parts which will be hereinafter fully described, shown in the accompanying drawings and then specifically defined in the appended claims.

I illustrate my invention in the accompanying drawings, in which:—

Figure 1 is a top plan view showing the application of my invention with the parts in their correct relative positions for operation.

Fig. 2 is an enlarged detail sectional view through the wheel.

Fig. 3 is a perspective view of a water gate, and Fig. 4 is a detailed view showing the screen about the circumference of the wheel.

Reference now being had to the details of the drawings by letter, A designates a waterway or canal leading from the river B, and mounted upon a suitable base intermediate the banks of the canal is a wheel C$^x$ comprising a central shaft C, the lower end of which has a collar C' fitted thereto, and the lower end of said shaft has a conical-shaped recess C$^2$, forming a bearing for the conical-shaped lug D rising from the plate D', which is adapted to be anchored on the bed of the canal in any suitable manner. The wheel is provided with radial, rectangular-outlined arms E which are bolted at E' to the hubs F of the wheel, and H are wings having skeleton frames and pivotally mounted on shafts H' passing through apertures in the arms E, and their lower ends having bearings in the socket members H$^2$. Said wings are so arranged that they will swing outward when open and, when closed, will overlap one another so that any foreign matter lodging against the same will be thrown away therefrom and not permit the mesh work of the screen about the wheel to be clogged. Rings J are fastened to the outer marginal edges of said arms, and serve as means for reinforcing and holding the same in proper position, and also for holding the screen J' upon the wheel and which screen will serve to prevent fish passing through the wheel. Said wings are so mounted as to be easily removed and replaced when desired.

Upon either side of the wheel are mounted the automatic gates L, each made preferably upon the arc of a circle and pivotally connected to the vertically disposed rods N. Stops O are placed at locations adjacent to the gates and serve to limit the swinging movement of the gates in one direction. Said gates are made in the shape shown and positioned as illustrated in Fig. 1, and tend to automatically open in the event of any debris or foreign matter which might lodge against the screen about the wheel and which would be carried thereby against the outer free swinging edge of the gate, thus preventing the debris from lodging between the gates and wheel. In order to protect the wheel and gates from driftwood piles S are positioned in front of the wheel and spaced apart while a float M is positioned intermediate the wheel and piles, and serve as means for deflecting small trash which might pass between the piles.

In operation, in the event of any obstructions which may pass the piles and float and lodge against the screen about the wheel, the same will be carried by the wheel toward one of the automatic gates, and the pressure of foreign matter or debris against the gates will cause the latter to swing out, thus preventing any lodgement of the foreign matter intermediate the gate and the wheel, after which the debris will be carried down the stream by the current. If by chance any obstruction might cling to the screen, as the wheel rotates, such clinging obstruction as it comes in contact with the other gate will cause the same to open to permit the obstruction to pass by the same. The rapidity of action and the quickness of operation of the gates will permit fish in only limited quantities to pass by.

Should it be desired to cause the wheel to rotate in the opposite direction, it may be done by inverting the same which will throw the broad faces of the wings against the current to drive the wheel and feather when coming against the current.

What I claim to be new is:—

1. An apparatus for preventing fish and driftwood from going down waterways, comprising a vertically disposed shaft having a conical-shaped bearing recess in the lower end thereof, a collar fitted to said shaft, a plate having a conical-shaped bearing member rising therefrom and on which said shaft rests, a collar fitted to the lower portion of the shaft and extending below the same and extending about said bearing upon the plate, hubs fixed to the shaft, arms secured to said hubs, wings pivotally mounted upon said arms, a screen about the circumference of the wheel, swinging gates mounted at points diametrically opposite the wheel, and means for limiting the swinging movements of the gates in one direction.

2. An apparatus for preventing fish and driftwood from going down waterways, comprising a vertically disposed shaft having a conical-shaped bearing recess in the lower end thereof, a collar fitted to said shaft, a plate having a conical-shaped bearing member rising therefrom and on which said shaft rests, a collar fitted to the lower portion of the shaft and extending below the same and extending about said bearing upon the plate, hubs fixed to the shaft, arms secured to said hubs, wings pivotally mounted upon said arms, a screen about the circumference of the wheel, curved hinged gates having convexed and concave surfaces and mounted at points diametrically opposite relative to the wheel and adjacent thereto, stops against which the gates are adapted to contact to limit the swinging movements in one direction, the convexed surfaces of the gates being positioned toward and a slight distance from the wheel.

In testimony whereof I hereunto affix my signature in presence of two witnesses.

DANIEL W. KELLER.

Witnesses:
JOHN P. SAVAGE,
J. W. GRADY.

Copies of this patent may be obtained for five cents each, by addressing the "Commissioner of Patents, Washington, D. C."